(12) United States Patent
Perrella et al.

(10) Patent No.: US 8,935,352 B1
(45) Date of Patent: *Jan. 13, 2015

(54) METHODS AND SYSTEMS FOR CENTRALLY-CONTROLLED CLIENT-SIDE FILTERING

(75) Inventors: Ronald Perrella, Atlanta, GA (US); Steve Thobe, Roswell, GA (US); Gaiye Zhou, Duluth, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1998 days.

This patent is subject to a terminal disclaimer.

(21) Appl. No.: 11/194,198

(22) Filed: Aug. 1, 2005
(Under 37 CFR 1.47)

Related U.S. Application Data (63) Continuation of application No. 10/143,301, filed on May 9, 2002, now Pat. No. 6,925,586.

(51) Int. Cl.
  *G06F 15/16* (2006.01)
  *G06F 11/07* (2006.01)
  *H04L 12/24* (2006.01)

(52) U.S. Cl.
  CPC ........ *G06F 11/0781* (2013.01); *G06F 11/0709* (2013.01); *H04L 41/0604* (2013.01); *G06F 11/0787* (2013.01); *H04L 41/069* (2013.01); *G06F 11/0772* (2013.01); *G06F 11/0766* (2013.01)
  USPC ...................................................... 709/207

(58) Field of Classification Search
  CPC .............. H04L 51/0604; H04L 51/069; G06F 11/0709; G06F 11/0766; G06F 11/0772; G06F 11/0781; G06F 11/0787

USPC .......................................................... 709/207
  See application file for complete search history.

(56) References Cited

U.S. PATENT DOCUMENTS

| | | | |
|---|---|---|---|
| 4,047,977 A | | 9/1977 | Yoshida et al. ............... 148/264 |
| 5,293,619 A | | 3/1994 | Dean |
| 5,553,235 A | * | 9/1996 | Chen et al. ...................... 714/20 |
| 5,619,656 A | * | 4/1997 | Graf ............................... 709/224 |
| 5,862,330 A | | 1/1999 | Anupam et al. |
| 5,872,971 A | | 2/1999 | Knapman et al. |
| 5,884,033 A | * | 3/1999 | Duvall et al. .................. 709/206 |
| 5,941,996 A | * | 8/1999 | Smith et al. ..................... 714/47 |
| 5,958,006 A | * | 9/1999 | Eggleston et al. ............ 709/219 |
| 6,094,688 A | | 7/2000 | Mellen-Garnett et al. |
| 6,101,531 A | * | 8/2000 | Eggleston et al. ............ 709/206 |
| 6,202,199 B1 | * | 3/2001 | Wygodny et al. ............. 717/125 |
| 6,212,547 B1 | | 4/2001 | Ludwig et al. |

(Continued)

*Primary Examiner* — Ario Etienne
*Assistant Examiner* — Blake Rubin
(74) *Attorney, Agent, or Firm* — Myers Bigel Sibley & Sajovec, PA (57) ABSTRACT

Methods and systems to minimize the number of messages transmitted between a client and a server in a client-server network. The messages may be error messages, and may be associated with a log such as an error log. The client requests permission of the server to transmit a message(s) to the server. Upon receipt of the request, the server provides the client with a filter, which may include a filter table with a filter parameter(s). The server may provide the filter in real time and/or without the client or server having to go off-line. The client uses the filter to filter at least a selected message from the message(s). Once the client has filtered the selected message the client transmits the selected message and/or the associated log of the selected message to the server.

17 Claims, 4 Drawing Sheets

(56) References Cited

U.S. PATENT DOCUMENTS

| | | |
|---|---|---|
| 6,240,444 B1 | 5/2001 | Fin et al. |
| 6,249,803 B1 * | 6/2001 | Jindal et al. .................. 709/203 |
| 6,314,533 B1 | 11/2001 | Novik et al. ..................... 714/39 |
| 6,363,421 B2 * | 3/2002 | Barker et al. ................. 709/223 |
| 6,421,688 B1 * | 7/2002 | Song .............................. 707/203 |
| 6,470,388 B1 * | 10/2002 | Niemi et al. ................... 709/224 |
| 7,188,367 B1 * | 3/2007 | Edwards et al. ................ 726/24 |
| 2001/0025278 A1 | 9/2001 | Yourlo et al. ..................... 707/2 |
| 2002/0124214 A1 | 9/2002 | Ahrens et al. ................... 714/57 |
| 2002/0165986 A1 * | 11/2002 | Tarnoff ......................... 709/246 |

\* cited by examiner

METHODS AND SYSTEMS FOR CENTRALLY-CONTROLLED CLIENT-SIDE FILTERING

RELATED APPLICATION

The present application claims the benefit of priority as a continuation of U.S. application Ser. No. 10/143,301 filed May 9, 2002 now U.S. Pat. No. 6,925,586.

TECHNICAL FIELD

The inventions generally relate to client-server networks, and particularly, to the filtering of messages in a client-server network.

BACKGROUND

In data communications, the term "client-server network" generally relates to a single-system integration of elements that share workload or that distribute workload. Generally, the "network" of a client-server network is a local area network (LAN) used to link computers, peripheral devices, or other elements or systems under some form of standard control. The "server" of a client-server network, typically, is the computer in the network that performs the bulk of centralized or generalized tasks. A "client" is an element in the network that may request information from or otherwise may use the resources of the server.

A client and a server communicate through the exchange of messages. There are many different types of messages. One type of message that may be exchanged between a client and a server is an error message. There are different kinds of error messages in a client-server network. One kind of error message is an error message that is passed from a client to a server.

A client may send an error message to the server after the error message is generated. Alternatively, a client may collect error messages in a log. At some point, the client may transmit the log including the collected error messages to the server.

At the server, the error messages in the transmitted log may be retrieved. Some client-server networks include a filter at the server to filter the error messages, typically, based on some selected feature of an error message such as urgency or source. In use, a filter may be applied at the server to the error messages of the transmitted log. The error messages retrieved through use of a filter may be referred to as filtered error messages. The retrieval of error messages through use of a filter at a server is referred to as the "filter-server system".

Figure 1:
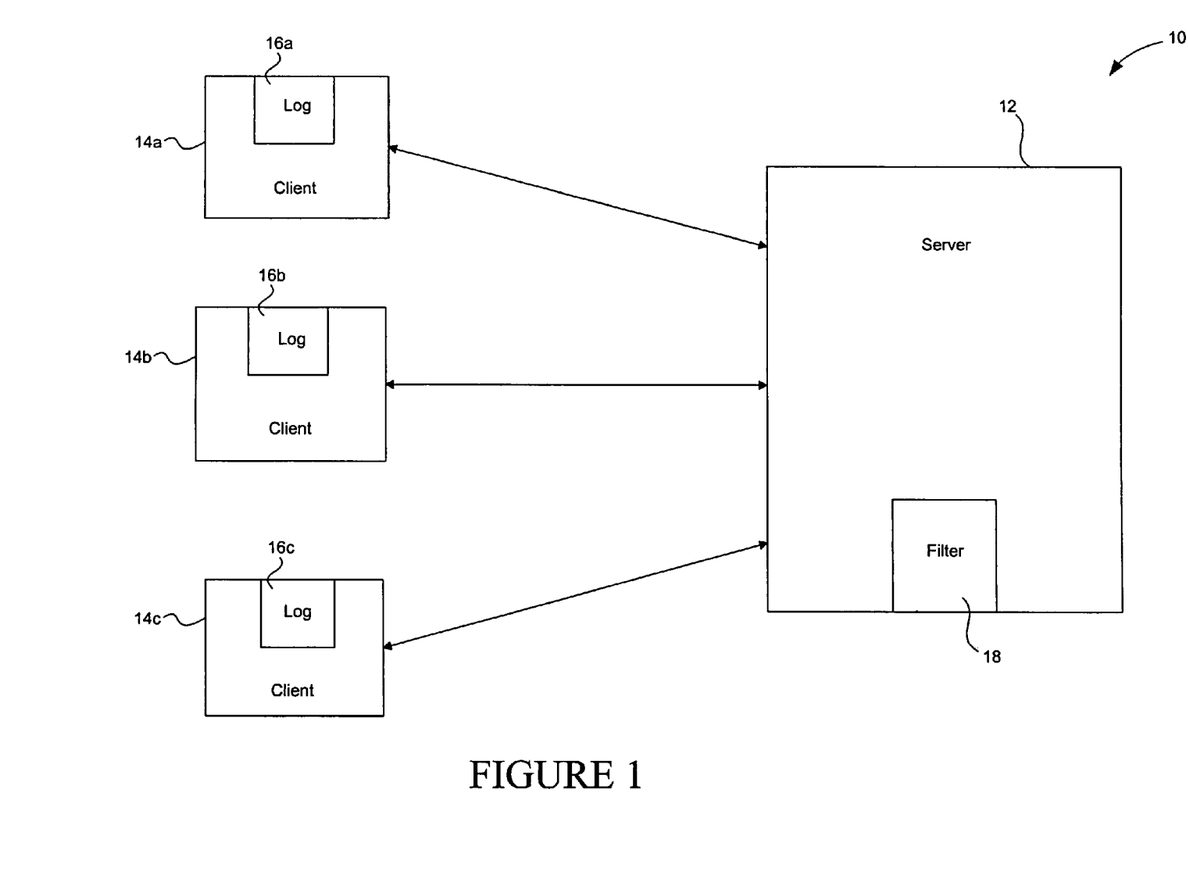
FIG. 1 illustrates a block diagram of an example of prior art.

FIG. 1 illustrates an example of the filter-server system described in the previous paragraph. Specifically, FIG. 1 illustrates a client-server network 10 including a server 12 connected to three clients 14a-c. Each client 14a-c accumulates, respectively, error messages in a log 16a-c. At some point, each client 14a-c transmits its respective log 16a-c to the server 12. The server 12 includes a filter 18 for use with respect to the error messages in the transmitted logs 16a-c received from the clients 14a-c. The filter 18 is applied to the error messages from each of the logs 14a-c to retrieve the filtered error messages.

Conveniently, a filter-server system allows for the retrieval at the server of filtered error messages. Among the drawbacks of the filter-server system is the drawback referred to as "over-transmission". The over-transmission drawback stems from the fact that, in the filter-server system, all of the error messages in a log at the client are transmitted to the server prior to the filtering of the error messages. In other words, every single error message in the log is transmitted by the client to the server. But all of the error messages may not be ultimately retrieved at the client. Thus, the transmission of all of the error messages from the client to the server is an over-transmission of messages.

The over-transmission of error messages is not only unnecessary, but undesirable. In fact, the over-transmission of error messages adds unnecessary, and therefore, extraneous traffic to the network. Extraneous traffic negatively burdens the network such as through a slow-down in overall message transmission or even a slow-down of network operation. Extraneous traffic is particularly undesirable in a client-server network including many clients. Each additional client multiplies the extraneous traffic on the network, and therefore, unnecessarily burdens the network.

To avoid the over-transmission drawback posed by the filter-server system, a different system referred to as the "filter-client system" has been used. As the term implies, in a filter-client system, each of the clients in the client-server network is provided with a filter. Generally, the filter is provided by the server to the clients. The client applies the filter to the error messages in a log to obtain filtered error messages. The client then sends the filtered error messages to the server. By filtering the error messages at the client, the filter-client system avoids the over-transmission drawback because only the filtered error messages are transmitted from the client to the server. The error messages that fail to pass the filter at the client are not transmitted to the server.

Even though the filter-client system avoids the over-transmission drawback, the filter-client system has other drawbacks. One drawback is the "filter-decision" drawback. As explained, in the filter-client system, a client filters the error messages into filtered error messages, which are then transmitted to the server. Thus, the decision of whether an error message is a "filtered error message" is made at the client rather than at the server. One result of making the filter-decision at the client rather than at the server is that the error messages may be filtered incorrectly or may not be filtered as desired by the server. The server may receive extraneous error messages. In addition, the server may fail to receive desired error messages because such messages failed to pass the filter-decision at the client. Thus, filtering the error messages at a client, rather than at a server, takes the control of such decision making away from the server, and as a result, the error messages may not be filtered according to the desires of the server.

As noted, often a filter is provided from a server to each of its clients. In the case of a server providing the filter, the filter-decision drawback may appear to be avoided. The drawback may appear to be avoided because the server provides the filter for the decision making to each of the clients. If the client uses the filter provided by the server, then the server should, at least in theory, receive the error messages the server desires as filtered error messages.

Even when the server provides the client with the filter, the filter-decision drawback may not be completely avoided because of the passage of time and the events that may happen during that time passage. For example, assume a server provides its clients with a filter so error messages having a specific characteristic are passed to the server as filtered error messages. With the passage of time, the server may require error messages having a different characteristic as filtered error messages. Yet, the filter at each client continues to filter the error messages based on the specific characteristic rather than the different characteristic. As a result, the server may receive unnecessary, and therefore extraneous error messages. So, the client-server network may experience the over-transmission problem described above in connection with a filter-server system. Also as a result, the server may fail to receive its desired messages as filtered error messages.

The obvious solution to the filter-decision drawback may be for the server to send a new filter to its clients whenever there are changes required by the server in the filtering of error messages. This solution may be referred to as the "new filter" solution. For example, assume the server has sent a filter A to all of its clients. Time passes, and then the server requires error messages having different characteristics. The server sends another filter, a filter B, to all of its clients. Thereafter, the clients use the filter B to filter the error messages.

But the new filter solution has its own drawbacks. For example, in some cases, a client must be taken off the network or even shut-down in order to receive a new or changed filter. Obviously, taking a client off-line or shutting it down to accomplish the filter change may negatively affect the performance of the overall network as well as the client. If all of the clients have to be taken off-line or shut down for the filter change, the whole network may be negatively affected.

The drawbacks and problems discussed above have referred to error messages, but the drawbacks and problems also may apply to other types of information exchanged between a client to a server in a client-server network. These drawbacks and problems may especially apply if there is any type of filtering of information transmitted from a client to a server.

In sum, there is a need in client-server networks for improved methods and systems relating to the exchange of information between a client and a server in such networks. Particularly, there is a need for improved methods and systems that provide for the transmission of messages from a client to a server, and specifically, for the filtering of the messages so that only filtered messages are transmitted from the client to the server. Even more particularly, there is a need for improved methods and systems that accomplish the filtering of the messages at the client based on filter characteristics desired by the server. Finally, there is a need for improved methods and systems that accomplish the desired filtering without the need to take clients off-line or to shut them down or to otherwise burden the network.

As a result, per the present inventions, only filtered messages are transmitted from the client to the server. Moreover, the client filters the messages based on filter characteristics desired by the server. Further, the desired filtering is accomplished without the need to take a client off-line or to shut a client down or to otherwise burden the network.

SUMMARY

The methods and systems according to the present inventions overcome the drawbacks of the prior art. The inventions described herein minimize the number of messages transmitted between a client and a server. The number of messages are minimized by causing the client to filter the messages using a filter updated as necessary via updated filters received from the server. The client may then transmit selected messages to the server. The methods and systems according to the present invention transmit a copy of the filter from the server to the client only when necessary so as to reduce the overall traffic on the client-server network. Moreover, the filtering of messages at the client may be based on filter characteristics desired by the server. Additionally, the methods and systems according to the present inventions may minimize the number of messages transmitted between a client and a server without the need to take clients off-line or to shut them down or to otherwise burden the network.

Stated generally, the present invention discloses methods and systems for minimizing the number of messages that are transmitted from a client to a server in a client-server network without discarding the messages requested by the server. More specifically, the present invention discloses a method to minimize the number of messages transmitted between a client and a server in a client-server network. The messages may be error messages, and may be associated with a log such as an error log. The client requests permission of the server to transmit a message(s) to the server. Upon receipt of the request, the server provides the client with a filter, which may include a filter table with a filter parameter(s). The server may provide the filter in real time and/or without the client or server having to go off-line. The client uses the filter to filter at least a selected message, which may be associated with a selected log, from the message(s). Once the client has filtered the selected message the client transmits the selected message and/or the selected log associated with the selected message to the server.

The present invention further discloses a system to minimize the number of messages transmitted between a client and a server in a client-server network. The messages may be error messages, and may be associated with a log such as an error log. The client is operative to request permission of the server to transmit messages to the server. Upon receipt of the request, the server is operative to provide the client with a filter which may include a filter table with a filter parameter(s). The client is also operative to use the filter to filter at least a selected message, which may be associated with a selected log, from the messages. The client is further operative to transmit the selected message and/or the selected log associated with the selected message to the server.

The present invention also discloses a method to minimize the number of error messages transmitted between a client and a server in a client-server network. The client requests permission of the server to transmit an error message(s) to the server. The error message(s) may be associated with a log such as an error log. Upon receipt of the request, the server provides the client with a filter. The filter may include a time stamp and a filter table with a filter parameter(s). The client uses the filter to filter at least a selected error message, which may be associated with a selected error log, from the error message(s). Once the client has filtered the selected error message the client transmits the selected error message and/or the selected error log of the selected message to the server.

Advantageously, the methods and systems according to the present invention accord filtering decisions to the server while creating the selected error log within the client. In addition, the present inventions allow the server to update the filter and provide the updated filter to the client in real time, without having to shut down any portion of the client-server network.

These and other features and advantages of the methods and systems according to the present invention may be more clearly understood and appreciated from a review of the following detailed description of the preferred embodiments and by reference to the appended drawings and claims.

DETAILED DESCRIPTION

The methods and systems according to the present inventions contemplate interaction of a server and one or more clients within a client-server network. The "client-server" of a client-server network may refer to a hardware configuration, to a software configuration, or to a combination thereof.

A "client" in a hardware configuration generally is a computer such as a personal computer (PC), intelligent device, or workstation used by a user. In use, the client may carry-out tasks in the process of which the client may request information or otherwise may use the resources of another object such as the server to accomplish such tasks.

A "server" in a hardware configuration generally also is a computer such as a personal computer (PC) or other intelligent device. A server typically performs the bulk of centralized or generalized task in the network and often has more memory, processing speed, and storage than other devices on the client-server network. Alternatively, the server may perform specialized tasks such as distributing electronic mail or printing.

In the software arrangement, a "server" typically is a program that provides data, stores data, or provides some service to other programs to which the server is connected. A server may be a program with higher priority, greater memory, or greater capabilities compared to the other programs connected through the network. A server also may be a program that includes specialized capabilities or has higher priority with respect to certain tasks or functions.

A "client" in the software arrangement generally is a program used by a user. A client program typically makes use of data, processing, storage, or other resources of another program. A client may be used to communicate with a source or destination through a higher priority, more powerful, more capable or different program.

Any given device or program may be capable of acting as a client and/or a server depending on the role the device or program plays based on the nature of the connection between the device or program and other elements. In other words, rather than a specific type of device or program, the terms "client" and "server" refer to the role a device or program performs during a specific connection or communication with another device, program or element.

Figure 2:
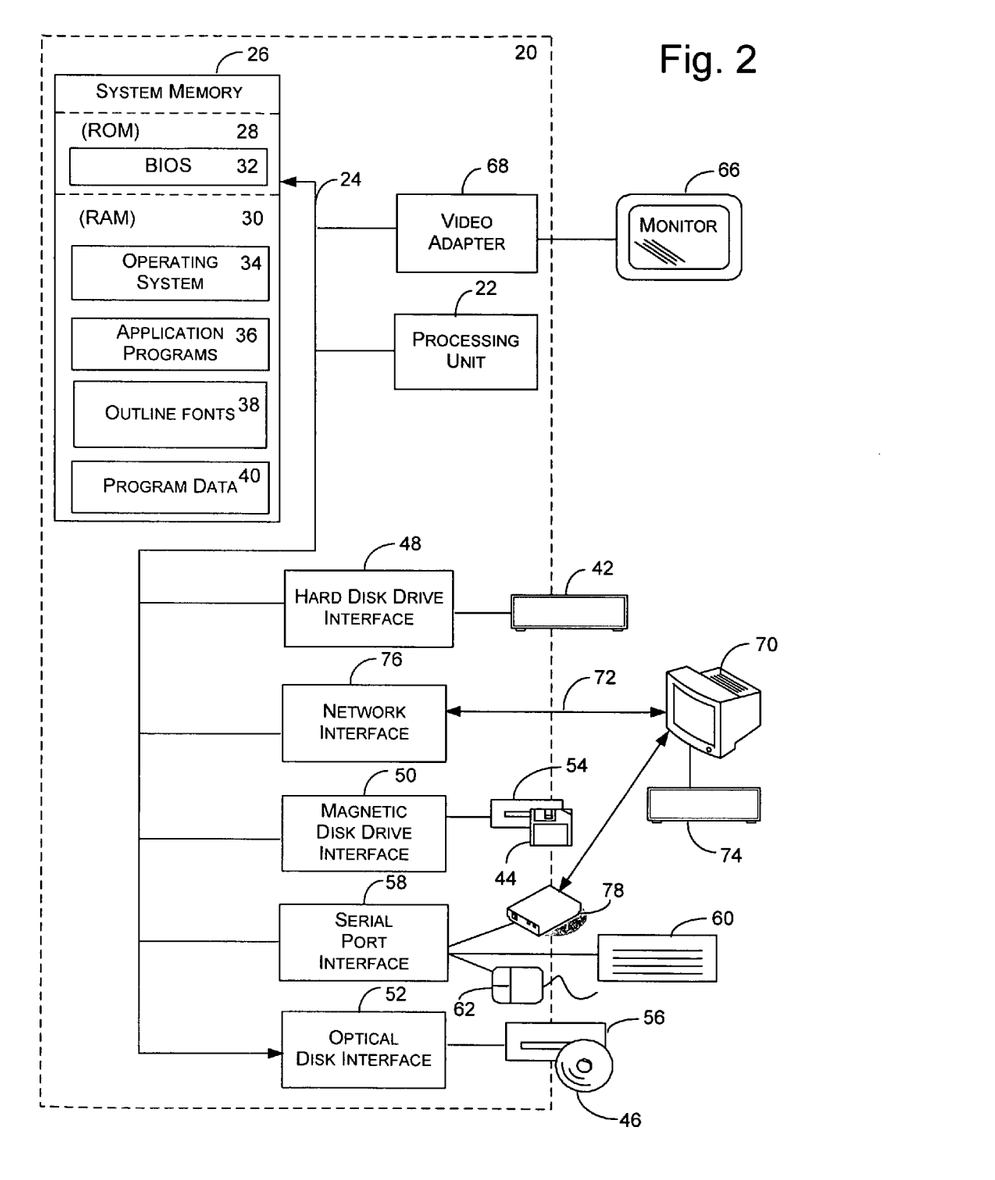
FIG. 2 illustrates an exemplary computing environment.

An Exemplary Computing Environment—FIG. 2

FIG. 2 illustrates an exemplary environment 20 for implementing the inventions in or through use of a personal computer (PC). For example, the inventions may be implemented through an application program running on an operating system of a PC. The inventions also may be practiced with other computer system configurations, including hand-held devices, multiprocessor systems, microprocessor based or programmable consumer electronics, mini-computers, mainframe computers, etc.

The application program may include routines, programs, components, data structures, etc. that implement certain abstract data types, perform certain tasks, actions, or tasks. In a distributed computing environment, the application program (in whole or in part) may be located in local memory, or in other storage. In addition, or in the alternative, the application program (in whole or in part) may be located in remote memory or in storage to allow for the practice of the inventions where tasks are performed by remote processing devices linked through a communications network.

FIG. 2 illustrates a PC 20 including a processor (also referred to as a processing means or processing unit) 22 joined by a system bus 24 to a memory (also referred to as system memory) 26. The memory 26 may include read only memory (ROM) 28 and random access memory (RAM) 30. The ROM 28 stores the basic input/output system (BIOS) 32, which contains basic routines that aid in transferring information between elements within the PC 20 during start-up, and at other times. The RAM 30 may store program modules and drives. In particular, the RAM 30 may include an operating system 34, one or more application programs 36, outline fonts 38, program data 40, a web browser program (not illustrated), etc.

The PC 20 also may include a plurality of drives interconnected to other elements of the PC 20 through the system bus 24 (or otherwise). Exemplary drives include a hard disk drive 42, a magnetic disk drive 44, and an optical disk drive 46. Specifically, each disk drive may be connected to the system bus 24 through an appropriate interface (respectively, a hard disk drive interface 48, a magnetic disk drive interface 50, and an optical drive interface 52). Further, the PC 20 may include non-volatile storage or memory through the drives and their associated computer-readable media. For example, the magnetic disk drive 44 allows for the use of a magnetic disk 54; and the optical disk drive 46 allows for the use of an optical disk 56. Other types of media that are readable by a computer, e.g., magnetic cassettes, digital video disks, flash memory cards, ZIP cartridges, JAZZ cartridges, etc., also may be used in the exemplary operating environment.

In addition, the PC 20 may include a serial port interface 58 connected to the system bus 24. The serial port interface 58 connects to input devices that allow commands and information to be entered. These input devices may include a keyboard 60, a mouse 62, and/or other input device. Pens, touch-operated devices, microphones, joysticks, game pads, satellite dishes, scanners, etc. also may be used to enter commands and/or information. The input devices also may be connected by other interfaces, such as a game port or a universal serial bus (USB). Further, the PC 20 may include a monitor or other display screen 66. The monitor 66 is connected through an interface such as a video adaptor 68 to the system bus 24. The PC 20 may include other peripheral and/or output devices, such as speakers or printers (not illustrated).

The PC 20 may be connected to one or more remote computers 70, and may operate in a network environment. The remote computer 70 may be a PC, a server, a router, a peer device or other common network node, and may include many or all of the elements described in relation to the PC 20. The connection between the PC 20 and the remote computer 70 may be through a local area network (LAN) 72 and/or a wide area network (WAN) 74. The PC 20 is connected to the LAN 72 through a network interface 76. With respect to the WAN 74, the PC 50 may include a modem 78 or other device to channel communications over the WAN 74, or global data communications network (e.g., the Internet). The modem 78 (internal or external) is connected to the system bus 24 via the serial port interface 58. The network connections illustrated in FIG. 2 are exemplary and other ways of establishing a communications link between the PC 20 and a remote computer 70 may be used.

Figure 3:
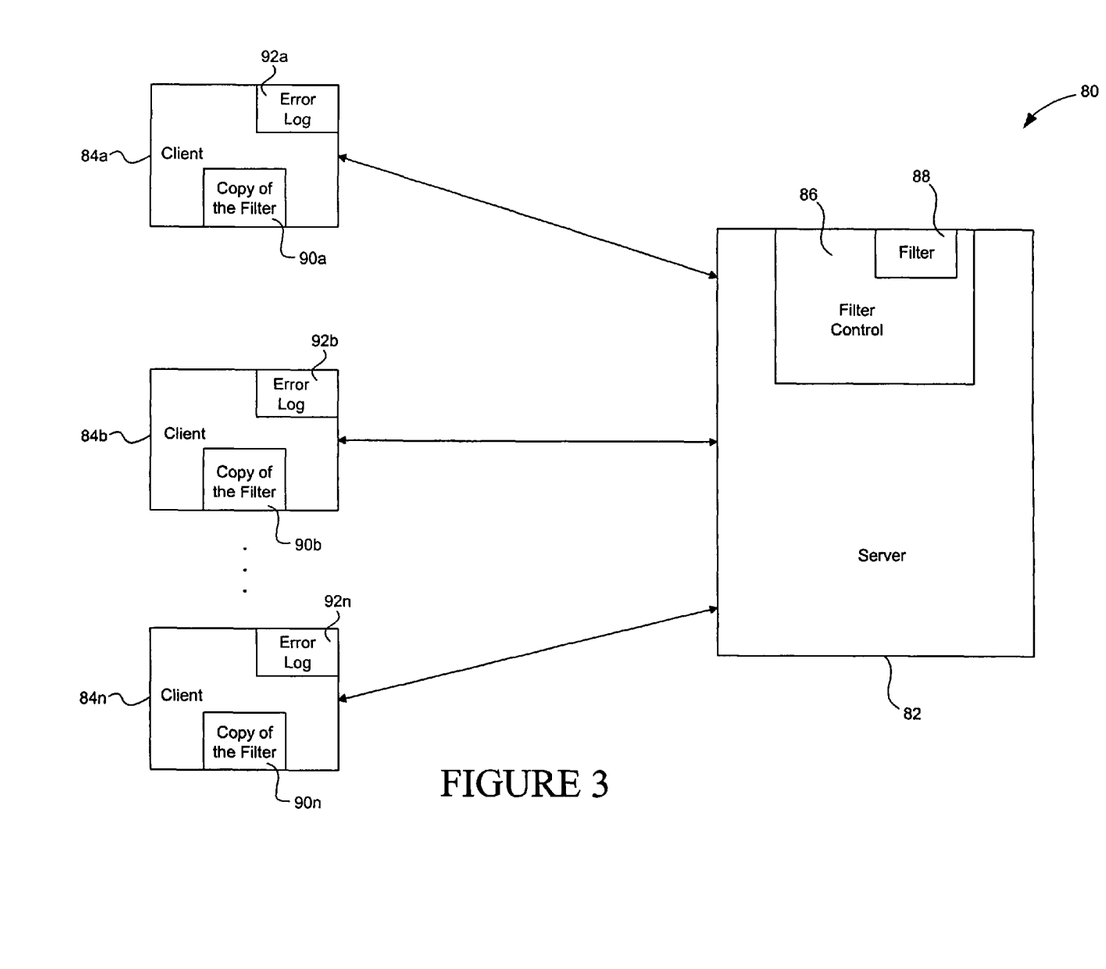
FIG. 3 illustrates a block diagram of an exemplary embodiment of the invention.

An Exemplary Embodiment—FIG. 3

FIG. 3 illustrates an exemplary embodiment of a client-server network according to the present inventions. Specifically, FIG. 3 illustrates a client-server network 80 including a server 82 connected to a plurality of clients 84a-n. An especially powerful server may be referred to as a superserver. A server can be specialized such as a print server, mail server, etc. Nonetheless, a server that performs the bulk of centralized or generalized tasks in the network often has more memory, processing speed, and storage than other computers, devices, or systems on the network. Alternatively, a client-server network may have more than one server, and multiple servers in a network are not uncommon.

The server 82, in an exemplary embodiment of the invention, includes a filter control 86 and a filter 88. The filter control 86 manages the creation and modification of the filter 88 and may be located within the server 82 or accessible to the server 82. The filter 88 governs the filtering of error messages by clients 84*a-n*, and particularly, within error logs 92*a-n* located, respectively, in the clients 84*a-n*. In particular, the server's filter 88 may be set by the filter control 86 to hold or pass error messages having a certain characteristic or feature. The error messages that pass through the filter are referred to herein as selected error messages. The error messages that do not pass through the filter (for failure to include the certain characteristic or feature or otherwise) generally are held or discarded, and therefore may be referred to as discarded error messages.

More particularly, the filter 88 may utilize filtering parameters, features or characteristics to filter error messages by date, time, type of error. For example, the filter 88 may filter an error log 92*n* for error messages that indicate program errors. As an alternative, the filter may be set so that error messages may be retrieved in some specific order, or only some of the error messages may be retrieved such as retrieval of only those error messages having a certain characteristic. The filter 88 may be set to retrieve only error messages having a specific feature or characteristic in common. For example, the filter 88 may be set to check each of the error messages of a log for a level of urgency, and pass only the error messages having the highest level of urgency.

Generally, the filter 88 may be updated or changed from time to time by the filter control 86 so the filter 88 is set to pass error messages having a different and/or additional characteristic(s) or feature(s). References herein to "changing a filter" relate to the changing of the filtering parameters, characteristic(s), or feature(s) reviewed or used by the filter (or copies of the filter or updated filters at the clients) and that allow an error message to pass through the filter or to be held or blocked by the filter. A filter 88 may be changed by the filter control 86 generally at any time and for a variety of reasons. For example, the filter 88 may be updated periodically or whenever the network administrator desires to receive different types of error messages.

An error message that is passed from a client to a server is a message about an error. Examples of the kinds of errors that may occur in a client include: run-time errors, program errors, network errors, stack errors, and/or input-output errors.

Also illustrated in FIG. 3 are the clients 84*a-n* connected to the server 82. Each client 84*a-n* includes a respective error log 92*a-n* and a copy of the filter 90*a-n*. Each "copy of the filter" 90*a-n* is a copy of the filter 88. Each copy of the filter 90*a-n* may be provided to a respective client 84*a-n* from the server 82 as explained below in connection with FIG. 4.

The error logs 92*a-n* are used to keep a record of error messages associated with the errors that occur within the clients 84*a-n*. An error log 92*a-n* may be a table, a record, a database, or a storage device. For example, the error log 92*a* may be a database that records the time, date, location and error message associated with each error. The error logs 92*a-n* may be included in the clients 84*a-n* or accessible to the clients 84*a-n*. The error logs 92*a-n* do not necessarily store all error messages. The error logs may store one or more types of error messages. Further, the error logs 92*a-n* may possess information to access the error messages rather than to store the error messages.

Figure 4:
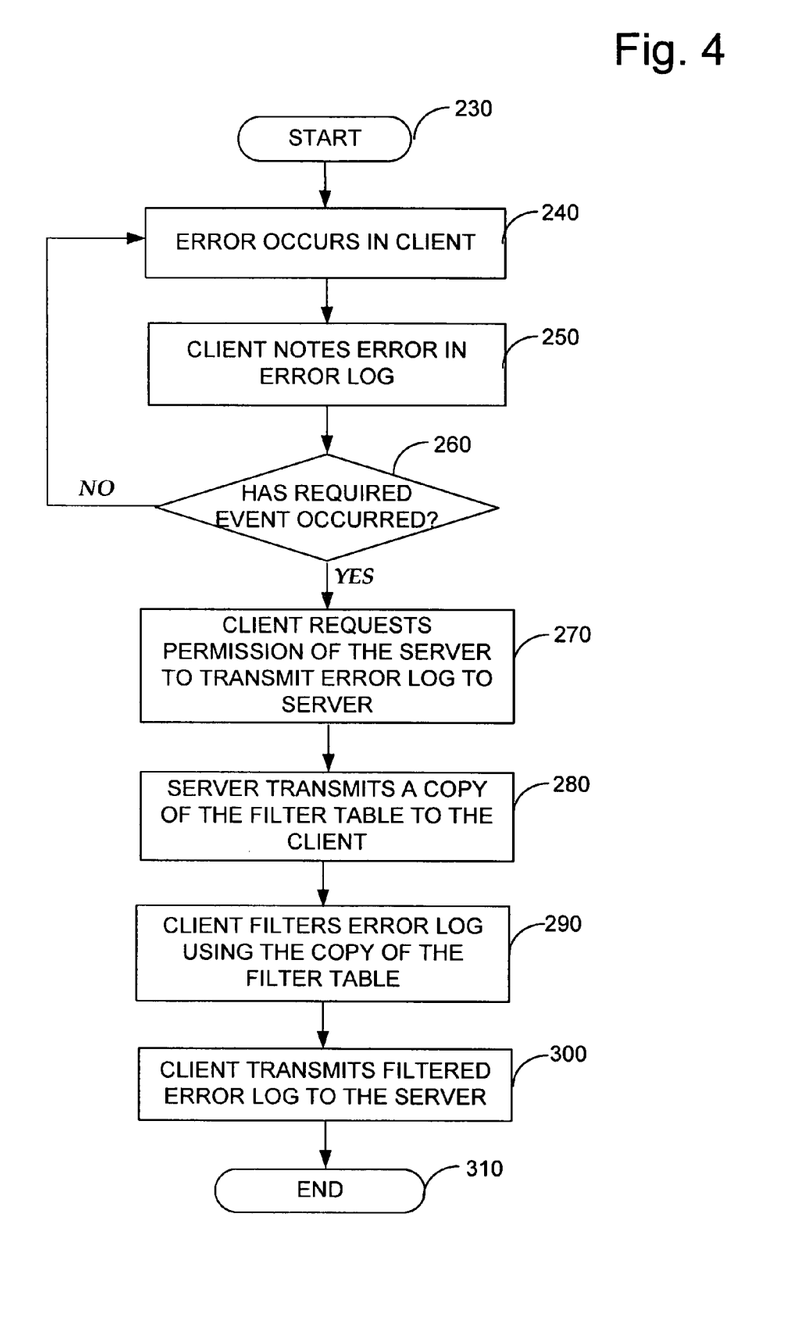
FIG. 4 is a flow diagram of the general actions taken by an exemplary embodiment of the invention following initial setup.

Actions of an Exemplary Embodiment—FIG. 4

FIG. 4 illustrates a flow diagram of the general actions taken by a client-server network according to an exemplary embodiment of the present inventions. After start 230, in the example described, an error occurs in the client in action 240. In action 250, the client logs or notes the error by entry of an error message in an error log. As indicated by the yes/no of action 260, the logging of error messages may continue to take place until one or more event(s) occur. If an event has not occurred that would halt the logging of error messages, then the method returns to action 240 and monitors for the occurrence of an error. If an event has occurred, then the method continues as explained below.

Still referring to FIG. 4, subsequent to the occurrence of an event that halts the logging of error messages, in action 270 the client requests permission of the server to transmit the error log to the server. In alternate embodiments, the client may request permission to transmit a message(s) such as an error message(s) to the server. At this point, the client does not have a filter such as a copy of the filter in the server. Hence, the request from the client does not contain a time stamp associating a time with the filter or copy of the filter in the client. The time in such a time stamp may be a time the filter or copy of the filter was created, received by the client, sent by the server to the client, or other time. Moreover, the time stamp may or may not include a time, and/or may include other information to distinguish the filter or copy of the filter. For example, the information in the time stamp may include a series number or other identifier.

Subsequent to the server receiving the request from the client, the server transmits a copy of the filter to the client in action 280. The filter in the server may contain a time stamp. The time stamp of the filter in the server indicates when the filter in the server was created, last updated or changed by the filter control. In other words, the filter in the server is the "most recent" or "most up-to-date" filter and is marked as such by its time stamp. As with the time stamp in the client, the server time stamp may or may not include a time, and/or may include other information to distinguish the server filter.

Advantageously, the efficiency of the network is increased because the server does not transmit a copy of the filter until a filter is needed by the client. Moreover, network traffic is reduced because the server does not transmit filters that may become obsolete before being used by the client.

In action 290, after receiving the copy of the filter, the client utilizes the copy of the filter to filter the error messages in the error log. The error messages that pass the filter are selected error messages. Subsequent to filtering the error messages in the error log, the client transmits the selected messages in the filtered error log, herein also referred to as the selected error log, to the server in action 300. In alternate embodiments, the messages may not be associated with a log. Thus, the client utilizes the copy of the filter to filter a selected message(s) from the messages and subsequently transmits the selected message(s) to the server. Thereafter, the method of an exemplary embodiment of the present invention ends at action 310.

In an alternative embodiment, the methods and systems according to the invention may be initiated by a request for the error log received by a client from the server or network administrator. The request to the client from the server may include a copy of the filter at the server. The copy of the filter may include updated filtering parameters. Thus, the client may be provided with a copy of the filter without having requested permission of the server to transmit the error log.

For example, a network administrator may desire to investigate an error(s) occurring at a client to determine why the particular client is often not actively connected to the rest of the network, referred to as being "off-line." Thus the network administrator may investigate the errors by having the server provide a copy of the filter to the particular client and requesting the particular client to filter the error log using the copy of the filter.

The methods and systems according to the present inventions are not restricted to error logs and may be applied to the logging of any type of information. For example, the methods and systems of the present inventions may be utilized by a corporation with a headquarters in one city and satellite offices in different cities across the country. The server may be located at the headquarters with clients located in the satellite offices. In this example, the corporation may be planning to add hyperlinks to the corporate intranet homepage for frequently visited intranet sites. The clients at the satellite offices may maintain a log that records every internet or intranet site accessed by computers at the satellite site.

In this example, the required event is set to equal every midnight. Therefore, at midnight, the client requests permission of the server to send the log of internet and intranet sites. The request for permission includes a time stamp indicating when the copy of the filter stored within the client was last updated.

When the server at the headquarter receives the request, the server compares the time stamp in the request against the time stamp of the filter stored within the server. If the filter in the server postdates the copy of the filter in the client, the server sends the client in the satellite office an updated filter. The updated filter replaces the existing copy of the filter stored in the client. Thus, the satellite office has the most recent copy of the filter from headquarters.

The client in the satellite office may then use the filtering parameters from the updated filter to filter the log of internet and intranet sites. The filtering parameters within the updated filter may indicate which internet and intranet sites should be discarded or kept. In this example, the filtering parameters within the updated filter instruct the client to filter out all of the internet sites, leaving only the intranet sites. The client in the satellite office may then transmit the log of intranet sites to the server in the headquarters. A network administrator may then review the log of intranet sites sent by the client to determine the most frequently visited intranet sites.

Additional information relating to centrally-controlled client-side filtering may be found in the commonly-owned United States patent application entitled "Methods and Systems for Transmitting Messages with Centrally-Located Client-Side Filtering" concurrently filed on May 9, 2002 in the USPTO with this application and assigned patent application Ser. No. 10/143,302.

The exemplary embodiments of the present invention were chosen and described above in order to explain the principles of the invention and their practical applications so as to enable others skilled in the art to utilize the invention including various embodiments and various modifications as are suited to the particular use contemplated. The examples provided herein in the written descriptions or in the drawings are not intended as limitations of the present invention. Other embodiments will suggest themselves to those skilled in the art. For example, the log may be utilized to store many different types of information, including but not limited to network information, client error information or internet usage information. Therefore, the scope of the present invention is to be limited only by the claims below.

What is claimed is:

1. A method to reduce a number of messages communicated between first and second computing devices wherein the second computing device is remote from the first computing device, the method comprising:
   generating a message log associated with a plurality of messages at the first computing device;
   using the first computing device to transmit a request for permission to transmit a communication of at least one message from the plurality of messages of the message log wherein the request for permission is transmitted from the first computing device to the second computing device remote from the first computing device;
   based at least in part on the request for permission, receiving at the first computing device a filter to filter the message log wherein the filter is transmitted from the second computing device to the first computing device responsive to receiving the request for permission at the second computing device;
   after providing the filter to the first computing device, using the filter at the first computing device to filter the message log to generate a filtered message log including the one message from the plurality of messages associated with the message log; and
   after transmitting the request for permission and filtering using the filter, transmitting the filtered message log including the one message from the first computing device to the second computing device,
   whereby the number of messages communicated between the first and second computing devices is reduced based on the filter.

2. The method of claim 1, wherein the filter comprises a time stamp.

3. The method of claim 1, wherein the filter comprises a filter table.

4. The method of claim 1, wherein the message log comprises an error message log including a plurality of error messages, and wherein transmitting the filtered message log comprises transmitting the filtered message log including at least one error message.

5. A method to reduce a number of error messages communicated between first and second computing devices wherein the second computing device is remote from the first computing device, the method comprising:
   generating an error log at the first computing device wherein the error log is associated with a plurality of error messages;
   transmitting a request for permission to transmit at least one error message from the plurality of error messages of the error log wherein the request for permission is transmitted from the first computing device to the second computing device remote from the first computing device;
   receiving at the first computing device, in response to the request for permission to transmit at least one error message, a filter configured to filter the error log wherein the filter is transmitted from the second computing device to the first computing device in response to receiving the request for permission to transmit at least one error message at the second computing device;
   filtering the error log at the first computing device using the filter received from the second computing device to generate a selected error log, wherein the one error message is included in the selected error log; and
   communicating the selected error log including the one error message from the first computing device to the second computing device, whereby the number of error messages transmitted between the first and second computing devices is reduced based on the filter.

6. The method of claim 5, further comprising using the second computing device to provide the filter for filtering the error log, the filter comprising:
   a time stamp, and
   a filter table having at least a filter parameter.

7. The method of claim 5, further comprising receiving the filter from the second computing device at the first computing device when required.

8. A system that reduces the number of communicated messages, the system comprising:
   a first computing device configured to transmit a request for permission to a second computing device to transmit at least one message from a plurality of messages wherein the second computing device is remote from the first computing device; and
   a filter received at the first computing device from the second computing device in response to the request for permission and configured to filter the one message from the plurality of messages at the first computing device wherein the filter is transmitted from the second computing device to the first computing device responsive to receiving the request for permission at the second computing device,
   the first computing device further configured to transmit the one message to the second computing device, whereby the number of messages transmitted between the first and second computing devices is reduced based on the filter configured to filter the one message from the plurality of messages.

9. The system of claim 8, wherein the filter comprises a time stamp.

10. The system of claim 8, wherein the filter comprises a filter table.

11. The system of claim 8, wherein the messages comprise error messages.

12. The system of claim 8, wherein the selected message comprises a selected error message.

13. The system of claim 8, wherein the messages are associated with a log, and the first computing device being further configured to transmit the log to the second computing device.

14. The method of claim 1, wherein the message log comprises information necessary to access the plurality of messages, but does not store the plurality of messages.

15. The method of claim 5, wherein the error log comprises information necessary to access the plurality of error messages, but does not store the plurality of error messages.

16. The method of claim 1, wherein the message log stores the plurality of messages.

17. The method of claim 5, wherein the error log stores the plurality of error messages.

* * * * *